United States Patent
Bloeckl et al.

(10) Patent No.: US 7,440,402 B2
(45) Date of Patent: Oct. 21, 2008

(54) HYBRID DSL SYSTEM FOR TRANSMISSION OF HYBRID DSL DATA VIA A SUBSCRIBER ACCESS LINE IN ORDER TO INCREASE THE OVERALL DATA TRANSMISSION RATE OF BOTH TRANSCEIVERS

(75) Inventors: Reinhard Bloeckl, Unterhaching (DE); Gert Schedelbeck, Munich (DE)

(73) Assignee: Infineon Technologies AG, Munich (DE)

( * ) Notice: Subject to any disclaimer, the term of this patent is extended or adjusted under 35 U.S.C. 154(b) by 826 days.

(21) Appl. No.: 10/974,444

(22) Filed: Oct. 27, 2004

(65) Prior Publication Data
US 2005/0111365 A1    May 26, 2005

(30) Foreign Application Priority Data
Nov. 7, 2003    (DE) ................ 103 52 056

(51) Int. Cl.
*H04J 1/16* (2006.01)
(52) U.S. Cl. ...................... 370/232; 370/493
(58) Field of Classification Search .......... 370/493, 370/535, 419, 232; 379/93.05, 93.06, 399.01, 379/402; 375/222
See application file for complete search history.

(56) References Cited

U.S. PATENT DOCUMENTS

| | | | |
|---|---|---|---|
| 5,889,856 A | 3/1999 | O'Toole et al. | |
| 6,151,335 A | 11/2000 | Ko et al. | |
| 6,400,759 B1 * | 6/2002 | Liu et al. | 375/222 |
| 6,546,090 B1 | 4/2003 | Bremer et al. | |
| 6,741,604 B1 * | 5/2004 | Rippin et al. | 370/431 |
| 7,031,378 B1 * | 4/2006 | Muralt et al. | 375/219 |
| 7,233,649 B2 * | 6/2007 | Kelliher et al. | 379/93.05 |
| 2001/0033651 A1 | 10/2001 | Geiss et al. | |
| 2002/0141428 A1 * | 10/2002 | Posthuma | 370/419 |
| 2003/0031312 A1 * | 2/2003 | Elo | 379/387.01 |
| 2003/0095543 A1 * | 5/2003 | Oi | 370/352 |

FOREIGN PATENT DOCUMENTS

| | | |
|---|---|---|
| DE | 19933487 A1 | 7/1999 |
| DE | 10038375 A1 | 8/2000 |
| DE | 10120197 A1 | 4/2001 |
| WO | WO 99/29096 | 6/1999 |
| WO | WO 01/06713 A1 | 1/2001 |
| WO | WO 01/41388 A1 | 1/2001 |

OTHER PUBLICATIONS

Japanese Office Action dated Jun. 5, 2006.

\* cited by examiner

*Primary Examiner*—Min Jung
(74) *Attorney, Agent, or Firm*—Jenkins, Wilson, Taylor and Hunt, P.A.

(57) ABSTRACT

The hybrid DSL system (10) for transmission of hybrid DSL data via a subscriber access line (2030) has a baseband transceiver (101) for transmission of first data in a base frequency band via the subscriber access line (2030) at a first data transmission rate, a non-baseband transceiver (102) for transmission of second data in a non-base frequency band via the subscriber access line (2030) at a second data transmission rate, and a data link (103) for interchanging parameters between the baseband transceiver (101) and the non-baseband transceiver (102) in order to increase the overall data transmission rate of both transceivers (101, 102).

33 Claims, 4 Drawing Sheets dinner# HYBRID DSL SYSTEM FOR TRANSMISSION OF HYBRID DSL DATA VIA A SUBSCRIBER ACCESS LINE IN ORDER TO INCREASE THE OVERALL DATA TRANSMISSION RATE OF BOTH TRANSCEIVERS

TECHNICAL FIELD

The invention relates to a hybrid DSL system for transmission of hybrid DSL data via a subscriber access line in order to increase the overall data transmission rate of both transceivers.

BACKGROUND ART

The technical field of the invention relates to the transmission of two DSL (Digital Subscriber Line) services via a common subscriber access line between a subscriber terminal device and a subscriber switching center.

According to the prior art, the two DSL services which are transmitted via a common subscriber access line are essentially an ISDN service and an ADSL service.

According to the respective standards for ISDN and ADSL, the ISDN band (0-80 kHz) and the ADSL band (20 kHz to 1.1 MHz) overlap. If, for example, a subscriber terminal device is transmitting both an ISDN signal and an ADSL signal, the two signals must be separated from one another on the line using the out-of-band method.

U.S. Pat. No. 5,742,527 describes a flexible ADSL receiver (ADSL=Asymmetrical Digital Subscriber Line). In this known ADSL receiver, the bandwidth up to 138 kHz is reserved for ISDN transmission (ISDN=Integrated Service Digital Network), and the upstream channel of the ADSL starts from 138 kHz, with the downstream channel being specifically shifted.

In the recent past, various options have been implemented to allow ADSL data to be transmitted in parallel with ISDN data. All of these known proposals have required two transceivers, to be precise in each case one for the ISDN data and a further one for the ADSL data, with a specific frequency band being reserved for each modulation scheme, provided by the respective transceiver.

FIG. 1 shows a schematic arrangement for transmission of ISDN data and ADSL data via a common subscriber access line from a subscriber terminal device to a subscriber switching center, and from a subscriber switching center to a subscriber terminal device. The arrangement shown in FIG. 1 has a subscriber terminal device TEE which is connected to a subscriber switching center TVS via a common subscriber access line TAL. Furthermore, the subscriber switching center TVS is connected firstly to a postal private branch exchange PSTN for further transmission of speech data, and to a data network DN for further transmission of data.

The subscriber terminal device TEE has an analog splitter S, which separates the frequencies of the ISDN signal and of the ADSL signal, passes the ISDN signal to an ISDN transceiver ISDN-T, and passes the ADSL signal to an ADSL transceiver ADSL-T. The ISDN transceiver ISDN-T modulates and demodulates the data to be transmitted and the data to be received, respectively. ISDN data which is applied to the subscriber access line TAL is passed from the splitter S to the ISDN transceiver ISDN-T depending on its frequency, the ISDN transceiver ISDN-T demodulates this data, and sends the demodulated data to the ISDN terminal device ISDN-E. If, in contrast, the ISDN terminal device ISDN-E is generating data, then this is transmitted to the ISDN transceiver ISDN-T, which modulates this data and sends it via the splitter S and the subscriber access line TAL to the subscriber switching center TVS. The data path of the ADSL data operates in an analogous manner via the splitter S, via the ADSL transceiver ADSL-T and the ADSL terminal device ADSL-E, for example a computer.

The subscriber switching center TVS has an ISDN central office ISDN-ZB and an ADSL central office ADSL-ZB. The two central offices are connected to the subscriber access line TAL by means of an analog splitter S. A data path for ISDN data and a data path ADSL data are thus provided in the subscriber switching center TVS as well. The analog splitter S in the subscriber switching center TVS essentially has the same task as the splitter S in the subscriber terminal device TEE. Data received from the subscriber access line TAL is separated by the splitter S in the subscriber switching center TVS such that ISDN data from a lower frequency band is transmitted to or received from the ISDN central office ISDN-ZB, and higher-frequency components of the ADSL band are transmitted to or received from the splitter S to the ADSL central office ADSL-ZB.

The ISDN central office ISDN-ZB has an ISDN transceiver ISDN-T for each subscriber access line TAL which is connected to the subscriber switching center TVS. ISDN data received from the subscriber switching center TVS is processed by the appropriate ISDN transceiver ISDN-T with respect to the subscriber terminal device TEE from which the data was passed, and is passed to the postal private branch exchange PSTN.

An ADSL transceiver ADSL-T is likewise available in the ADSL central office ADSL-ZB for each subscriber terminal device TEE which is connected via a dedicated subscriber access line TAL, demodulates the received data and makes it available to a connected data network DN. When data is being transmitted in the complementary case from the data network DN to the subscriber terminal device TEE, the data network DN makes this data available, in a first step, to the corresponding ADSL receiver, ADSL-T. This modulates this data onto an ADSL band, and transmits this by means of the splitter S in the subscriber switching center TVS via the subscriber access line TAL to the corresponding subscriber terminal device TEE. The splitter S in the subscriber terminal device TEE then separates the frequency of the ADSL data signal from other frequencies, and makes it available to the ADSL transceiver ADSL-T in the subscriber terminal device TEE. The ADSL transceiver ADSL-T demodulates the ADSL data, and makes the demodulated ADSL data available to the ADSL terminal device ADSL-E.

The disadvantages of the prior art for transmission of hybrid DSL data via a common subscriber access line TAL are as follows: the two DSL services, essentially ISDN and ADSL according to the prior art, have different transmission ranges with respect to their transmission power. In this case, the DSL service ISDN, with the greater range, has unused reserves, that is to say the transmission power is not matched to the transmission channel and is accordingly unnecessarily high. An inadequate or unnecessarily high transmission power results in an unnecessarily high interference load for the remaining systems and for its own subscriber access line TAL. An unnecessarily high interference load means that the data rate which is transmitted via the subscriber access line TAL or via the subscriber access lines TAL must be reduced in order to achieve redundancy on the line. In a corresponding manner, an unnecessarily high transmission power on a subscriber access line TAL means an unnecessary reduction in the data transmission rate on the subscriber access line TAL and on all the other subscriber access lines TAL located in the same bundle.

A further disadvantage of the prior art is that the splitters S which are used in the subscriber terminal device TEE and in the subscriber switching center TVS are analog low-pass filters. Analog low-pass filters occupy a large amount of space and are not consistent with a high packing density, particularly in the subscriber switching centers TVS.

The object of the present invention is to provide a hybrid DSL system for transmission of hybrid DSL data via a subscriber access line TAL, with an unnecessarily high interference load on the subscriber access line TAL being reduced, and with the overall data transmission rate on the subscriber access line TAL thus being maximized.

According to the invention, this object is achieved by the hybrid DSL system specified in claim 1 and by the method specified in claim 33 for transmission of hybrid DSL data via a subscriber access line.

The hybrid DSL system according to the invention and the corresponding method for common transmission of hybrid DSL data via a common subscriber access line have the advantage over the known solution approaches that the two transceivers for transmission of the hybrid DSL data are connected via a data link for interchanging parameters. Parameters are interchanged via this data link between the first DSL transceiver and the second DSL transceiver in order, inter alia, to adequately match the transmission powers of the two transceivers, and thus to increase the overall data transmission rate of both transceivers.

The idea on which the present invention is based essentially comprises the two DSL transceivers being provided with a data link for interchanging parameters.

According to the invention, a hybrid DSL system for transmission of hybrid DSL data via a subscriber access line is provided for this purpose, with a baseband transceiver being provided for transmission of first data in a base frequency band via the subscriber access line at a first data transmission rate, a non-baseband transceiver being provided for transmission of second data in a non-base frequency band via the subscriber access line at a second data transmission rate, and a data link being provided for interchanging parameters between the baseband transceiver and the non-baseband transceiver in order to increase the overall data transmission rate of both transceivers.

Advantageous developments and improvements of the respective subject matter of the invention can be found in the dependent claims.

According to one preferred development of the invention, the first data which is intended to be transmitted from the hybrid DSL system is speech data.

According to a further preferred development, the overall data transmission rate is the sum of the first data transmission rate and of the second data transmission rate.

According to a further preferred development, the baseband transceiver and the non-baseband transceiver are connected to a controller.

One advantage of this arrangement, according to which the baseband transceiver and the non-baseband transceiver are connected to a controller, is that the controller allows both the baseband transceiver and the non-baseband transceiver to be adjusted such that, for example, parameters such as the transmission power can be adequately matched.

According to a further preferred development, the baseband transceiver, the non-baseband transceiver and the controller form a control loop.

One advantage of this development is that the adequate matching of the parameters for the baseband transceiver and for the non-baseband transceiver is matched in a controlled manner.

According to a further preferred development, the data link for interchanging parameters is formed by a connection from the baseband transceiver to the controller, and by a connection from the non-baseband transceiver to the controller.

One advantage of this development is that the formation of the data link via the baseband transceiver, the non-baseband transceiver and the controller means that there is no need to provide a dedicated data link between the baseband transceiver and the non-baseband transceiver.

According to a further preferred development, the baseband transceiver and the non-baseband transceiver are integrated. One advantage of this development is that the integration of the baseband transceiver and of the non-baseband transceiver saves space.

According to a further preferred development of the invention, the baseband transceiver, the non-baseband transceiver and the controller are integrated.

According to a further preferred development of the invention, the subscriber access line is intended for the transmission of hybrid DSL data in a bundle of two or more subscriber access lines for transmission of at least one data stream.

According to a further preferred development, the data link is provided by an interface between the baseband transceiver and the non-baseband transceiver.

According to a further preferred development, the data link is a serial interface between the two transceivers.

According to a further preferred development, the data link is a parallel interface between the two transceivers.

According to a further preferred development, the transmission power of the baseband transceiver is adjustable so as to reduce the interference load for the subscriber access line for transmission of hybrid DSL data.

According to a further preferred development, the transmission power of the baseband transceiver (101) is adjustable so as to increase the second data transmission rate of the non-baseband transceiver (102).

One advantage of this development is that the adjustment of the transmission power of the baseband transceiver increases the second data transmission rate of the non-baseband transceiver, thus increasing the overall data transmission rate of the hybrid DSL system.

According to a further preferred development, the transmission power of the baseband transceiver is adjustable so as to reduce an interference load for the bundle of two or more subscriber access lines for transmission of at least one data stream.

One advantage of this development is that the adjustment of the transmission power of the baseband transceiver also reduces the interference load for other subscriber access lines within the bundle, so that the data transmission rate of the other subscriber access lines is increased.

According to a further preferred embodiment, the transmission power of the non-baseband transceiver is adjustable so as to reduce the interference load for the subscriber access line for transmission of the hybrid DSL data.

One advantage of this development is that the reduction in the interference load for the subscriber access line increases the overall data transmission rate of the subscriber access line.

According to a further preferred development, the transmission power of the non-baseband transceiver is adjustable so that an increase in the first data transmission rate of the baseband transceiver is provided.

One advantage of this development is that increasing the first data transmission rate of the baseband transceiver increases the overall data transmission rate of the subscriber access line or of the subscriber access lines.

According to a further preferred development, the transmission power of the non-baseband transceiver is adjustable so as to reduce the interference load for the bundle of two or more subscriber access lines for transmission of at least one data stream.

One advantage of this development is that the reduction in the interference load for the bundle of two or more subscriber access lines makes it possible to increase the respective data transmission types on these subscriber access lines.

According to a further preferred development, the baseband transceiver is an ISDN transceiver.

According to a further preferred development, the non-baseband transceiver is an XDSL transceiver.

According to a further preferred development, the XDSL transceiver is an ADSL transceiver.

According to a further preferred development, the XDSL transceiver is a VDSL transceiver.

According to a further preferred development, the parameters which are interchanged between the baseband transceiver and the non-baseband transceiver include both line parameters for the subscriber access lines and status parameters for the two transceivers.

According to a further preferred development, the line parameters include the channel attenuation on the subscriber access line, the signal-to-noise ratio on the subscriber access line, and interference parameters for the bundle of two or more subscriber access lines.

One advantage of this preferred development is that the stated parameters can be used for adjustment of the baseband transceiver and of the non-baseband transceiver, so that, for example, their transmission power is adequately matched.

According to a further preferred development, the status parameters include an activation state of the baseband transceiver, an activation state of the non-baseband transceiver, a block error rate for the baseband transceiver, a block error rate for the non-baseband transceiver, bandwidth setting parameters for the baseband transceiver, and bandwidth setting parameters for the non-baseband transceiver.

One advantage of this development is that the status parameters which are provided can be used for adjustment of the baseband transceiver and the non-baseband transceiver such that it is possible, for example, to adequately match their transmission power.

According to a further preferred development of the invention, a splitter, which is connected to the baseband transceiver and to the non-baseband transceiver, separates the base frequency band of the baseband transceiver and the non-base frequency band of the non-baseband transceiver.

According to a further preferred development, the splitter is a first-order filter system.

According to a further preferred development, the splitter is integrated.

According to a further preferred development of the invention, the splitter, the controller, the baseband transceiver and the non-baseband transceiver are integrated on a common assembly.

According to a further preferred development, the hybrid DSL system is provided in a subscriber terminal device.

According to a further preferred development, the hybrid DSL system is provided in a subscriber switching center.

According to a further preferred development, the hybrid DSL system is in each case provided in a subscriber terminal device and in a subscriber switching center, with the subscriber terminal device being connected to the subscriber switching center by means of a common subscriber access line.

Exemplary embodiments of the invention will be explained in more detail in the following description, and are illustrated in the drawings, in which:

DETAILED DESCRIPTION OF THE INVENTION

The same reference symbols in the figures denote identical or functionally identical elements.

Figure 1:
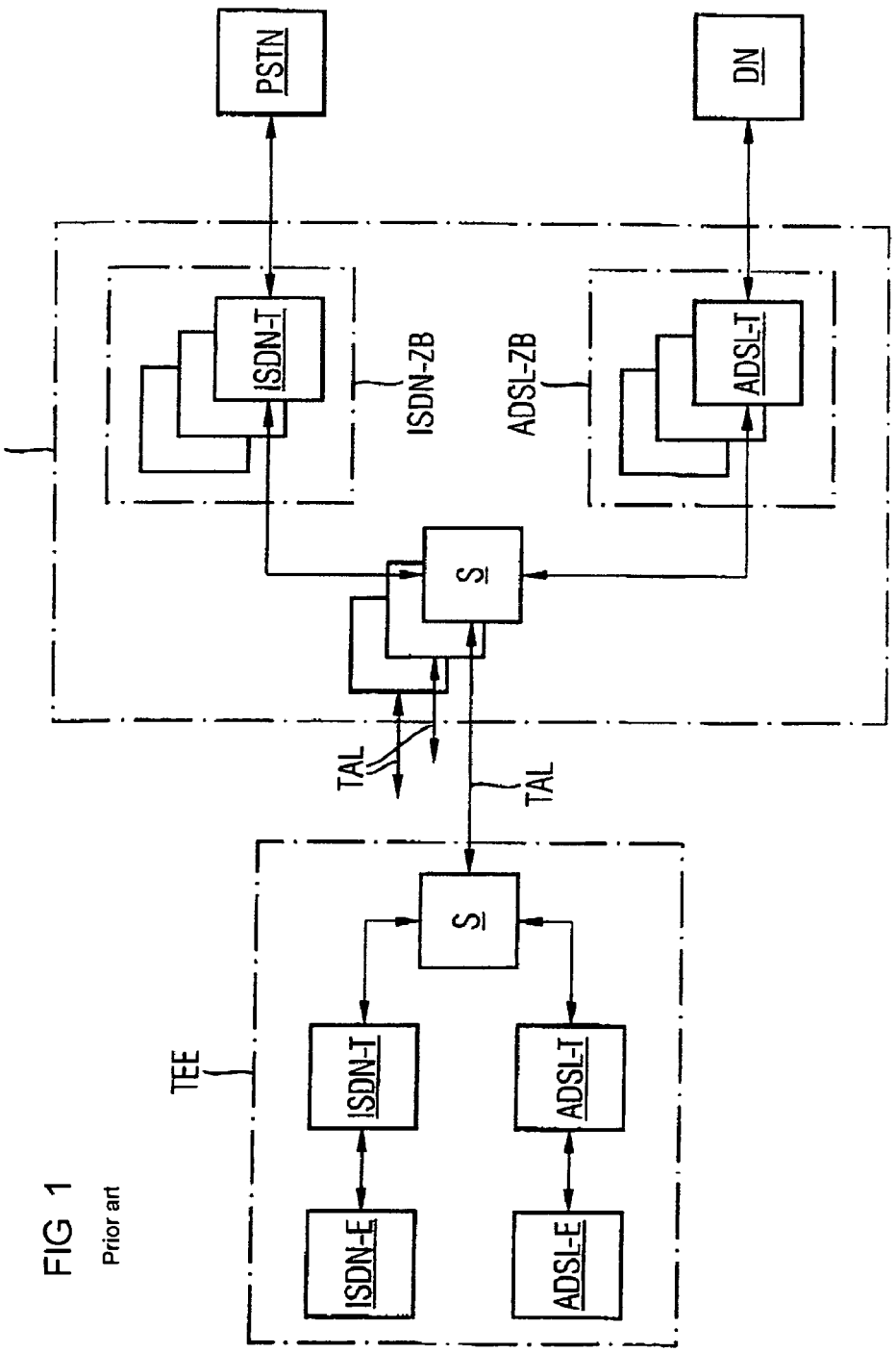
FIG. 1 shows a schematic block diagram of a conventional hybrid DSL system for transmission of hybrid DSL data, in this case ISDN and ADSL data.
Figure 2:
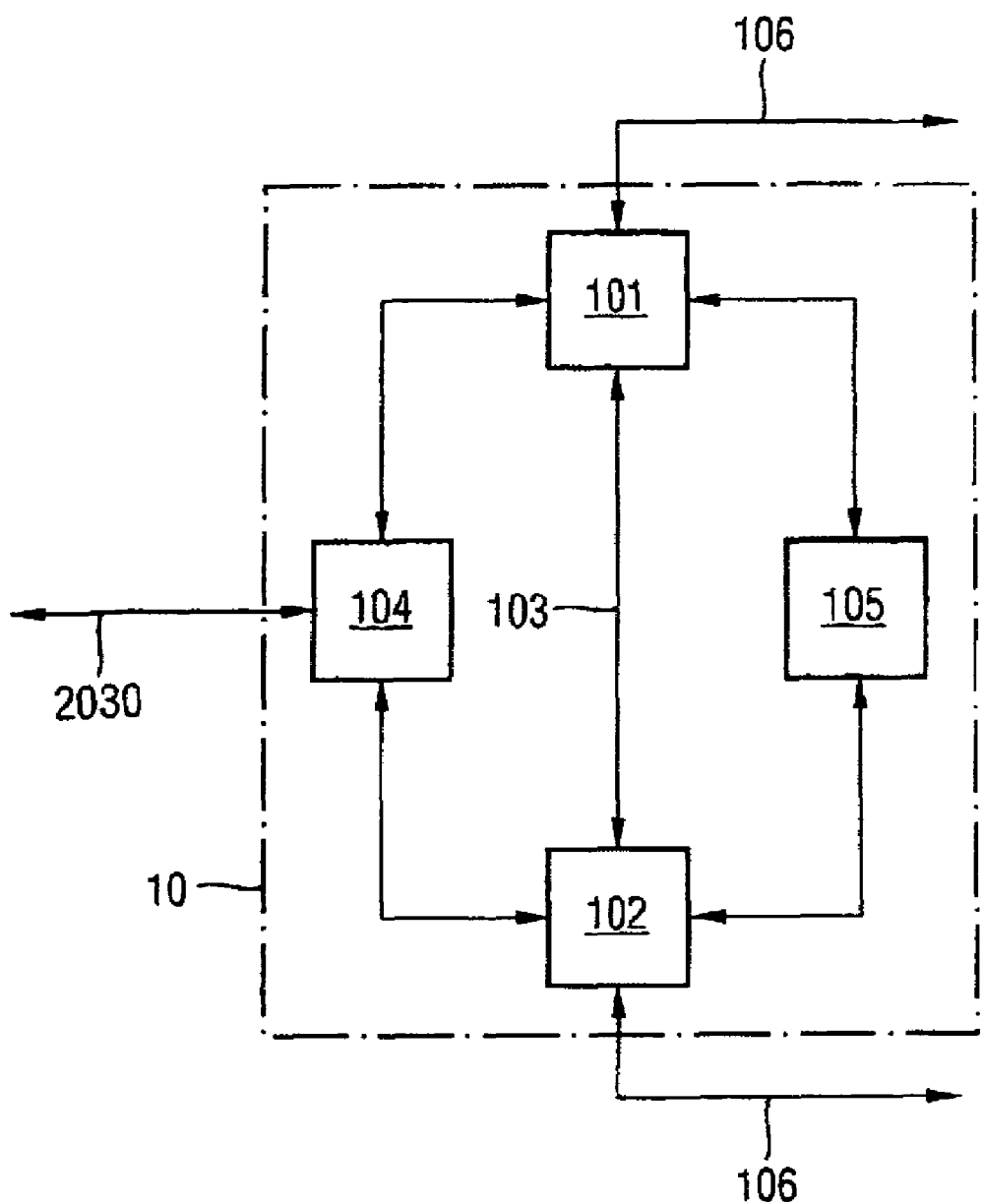
FIG. 2 shows a schematic arrangement according to the invention for a hybrid DSL system for transmission of hybrid DSL data.

FIG. 2 shows, schematically, an arrangement according to the invention for a hybrid DSL system 10 for transmission of hybrid DSL data.

The hybrid DSL system 10 is part of a subscriber terminal device 20 (not illustrated), or is part of a subscriber switching center 30 (not illustrated) and is connected to the corresponding other device via a subscriber access line 2030.

The hybrid DSL system 10 according to the invention has a baseband transceiver 101 and a non-baseband transceiver 102.

The baseband transceiver 101 is connected to the non-baseband transceiver 102 via a data link 103.

A first-order splitter 104, which is integrated together with the baseband transceiver and the non-baseband transceiver on the common assembly in the hybrid DSL system 10, separates the frequencies of baseband and of non-baseband, and provides the baseband transceiver 101 with the baseband of the received signal via the subscriber access line 2030. The first-order splitter 104 likewise provides the non-baseband transceiver 102 with the non-baseband of the received signal, which is on the subscriber access line 2030.

A controller 105 is connected both to the baseband transceiver 101 and to the non-baseband transceiver 102. The function of the controller 105 is to control the baseband transceiver 101 and the non-baseband transceiver 102 such that various parameters (for example the transmission power) relating to the transmission of the respective data, and various filter coefficients for the respective transceiver, can be adjusted. The controller 105 also controls the split between baseband and non-baseband on the subscriber access line 2030.

The baseband transceiver 101 is connected, by means of a link to a data switching device 106, to a data switching device for baseband 301 (not shown). The non-baseband transceiver 102 is connected via a link 106 to a data switching device for non-baseband 302.

If the hybrid DSL system 10 is used in a subscriber terminal device 20, the data switching device for baseband 301 is, for example, an ISDN telephone, and the data switching device for non-baseband 302 is, for example, a personal computer.

If the hybrid DSL system 10 is used in a subscriber switching center 30, the data switching device for baseband 301 is, for example, a postal private branch exchange and the data switching device for non-baseband 302 is, for example, a data network (Internet).

Figure 3:
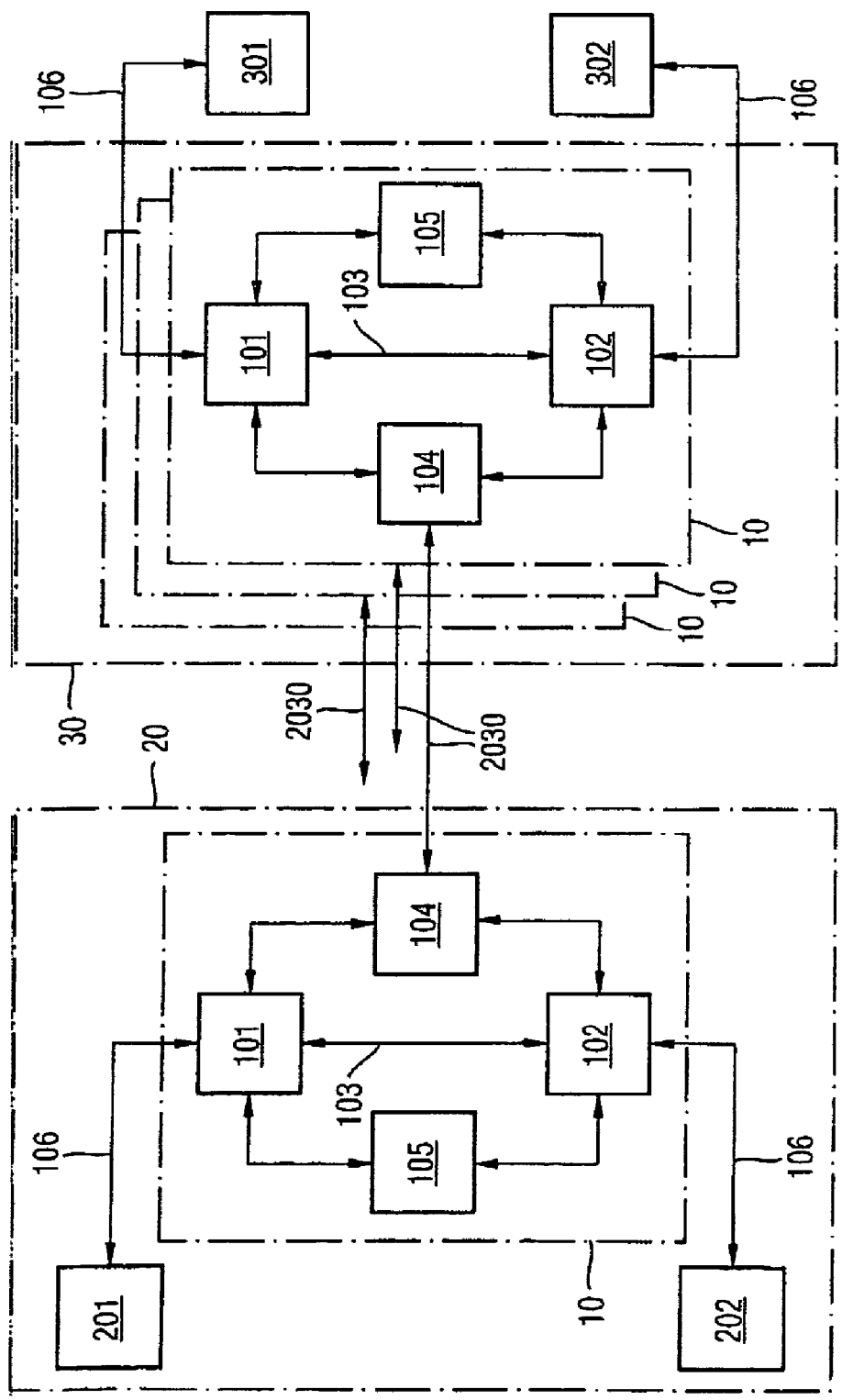
FIG. 3 shows a schematic block diagram according to the invention, with the hybrid DSL system according to the invention being used both in a subscriber terminal device and in a subscriber switching center.

FIG. 3 shows a schematic block diagram based on the invention, with the hybrid DSL system 10 according to the invention being used both in a subscriber terminal device 20 and in a subscriber switching center 30.

The arrangement illustrated in FIG. 3 shows a subscriber terminal device 20 connected via a subscriber access line 2030 to a subscriber switching center 30. The arrangement illustrated subscriber switching center 3 shows a subscriber terminal device 20 connected via a subscriber access line 2030 to form a subscriber switching center 30. 30 is connected, via a respective connection 106 to form a data switching device, to a data switching device for baseband 301, for example a postal private branch exchange, and to a data switching device for non-baseband 302, for example a data network (Internet).

A hybrid DSL system is in each case provided for each connected subscriber in the subscriber switching center 30.

Figure 4:
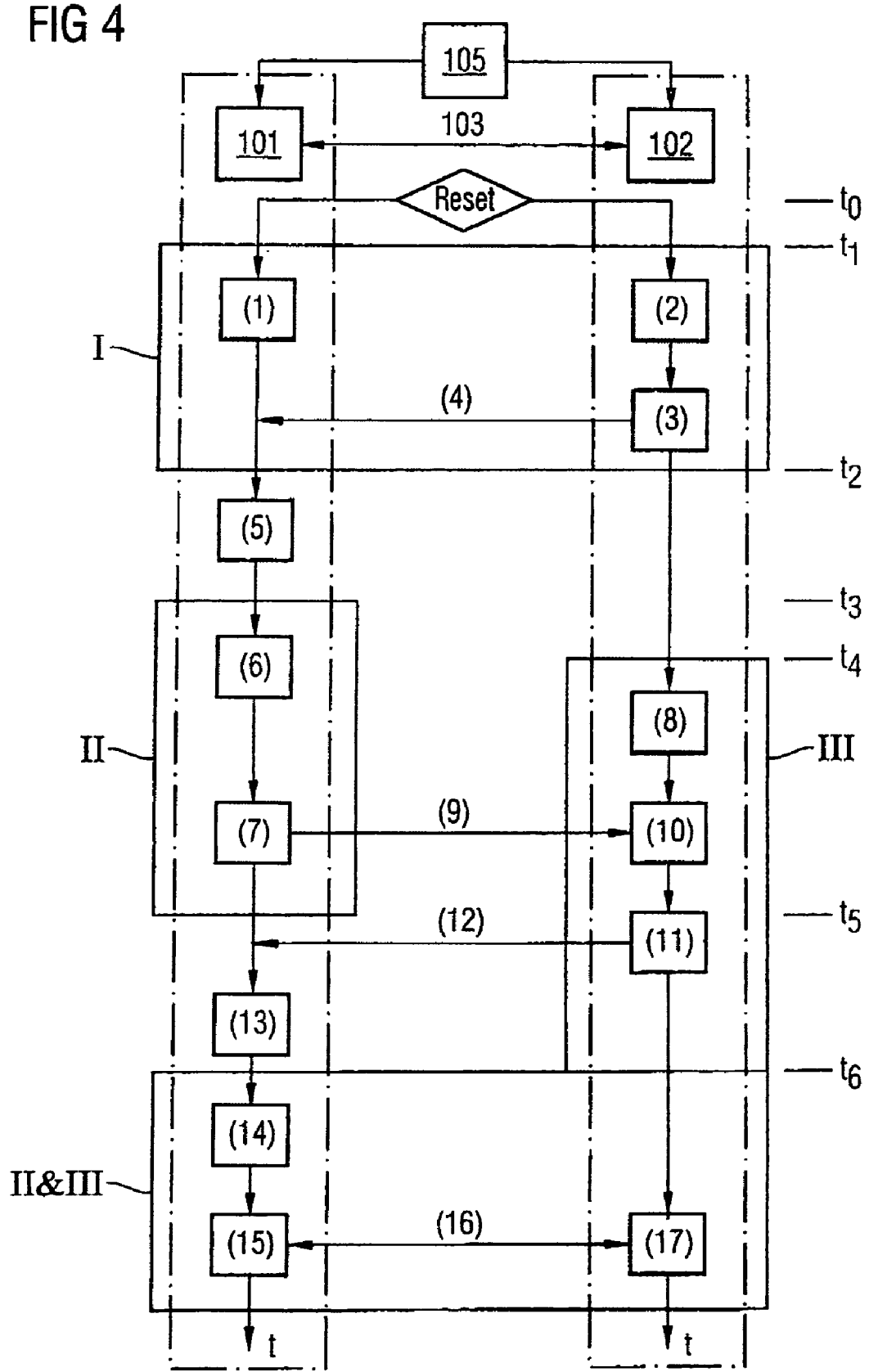
FIG. 4 shows a flowchart according to the invention for a method for matching of a hybrid DSL system in which an ISDN transceiver is provided as a baseband transceiver, and an ADSL transceiver is provided as a non-baseband transceiver.

FIG. 4 shows a flowchart according to the invention for a method for matching a hybrid DSL system, in which an ISDN transceiver is provided as the baseband transceiver 101, and an ADSL transceiver is provided as the non-baseband transceiver 102.

According to the invention, the ISDN transceiver 101 is connected to the ADSL transceiver by means of a data link 103, in this case a serial interface. Furthermore, both the ISDN transceiver 101 and the ADSL transceiver 102 are connected to a controller 105, a microcontroller.

Various initialization processes for the coefficients of the two receivers as well as possible interrupts and calculations are then provided, in the following text, by means of status and line parameters via the microcontroller.

The dotted outline on the left in FIG. 4 shows various states of the ISDN transceiver 101. The dotted outline on the right in FIG. 4 shows various states of the ADSL transceiver at different time $t_i$.

A new session of the hybrid DSL system starts with the system being reset at the time $t_0$.

After the reset at the time $t_0$, the system is initialized in the time period between the times $t_1$ and $t_2$.

The references (i) in brackets address the various states for the ISDN transceiver 101 and for the ADSL transceiver 102 in FIG. 4.

In the initialization phase I, the ISDN transceiver 101 is in the state (1), with the IDSN transceiver in this state (1) after the reset being in a state which does not yet comply with the standard. In the initialization phase I, the ADSL transceiver is first of all in the state (2), with the general program code for operation of the ADSL transceiver being loaded here. In this state, no optimized parameters for adjustment of the ADSL transceiver are yet available. For this reason, only the default or standard data is loaded.

Following the state (2), the ADSL transceiver is in the state (3) of the initialization phase I. In the state (3) of the initialization phase I, various parameters which are specific for the design or layout of the hybrid DSL system 10 are signaled to the ADSL transceiver, such as the association between the ISDN channels and the corresponding ADSL channels in the form of an address table.

The reference (4) shows that the data link 103 is used in the initialization phase I in order to send standard filter coefficients from the ADSL transceiver 102 to the ISDN transceiver 101. In this case, the ADSL transceiver 102 is used as a transmitter, since the ISDN transceiver 101 generally does not have its own microprocessor interface. The transmission of the standard filter coefficients by means of the ADSL transceiver via the serial interface (the data link) in the initialization phase I improves the flexibility of the overall system, in that this allows further developments simply by updating the filter coefficients.

After the initialization phase I, the ISDN transceiver cuts off potential disturbances for the ADSL band (5) by means of digital low-pass filtering. Furthermore, the standard filter coefficients or updated standard filter coefficients obtained are used in the state (5) in the ISDN transceiver 101 to set the ISDN transceiver. After this step, the ISDN transceiver is ready to operate. At the time $t_3$, the ISDN transceiver starts to receive and transmit data. The ISDN transceiver 101 is now in the ISDN mode II. The ISDN mode II is started by a "Power-up" (6).

In the state (7) in the ISDN mode II, the ISDN transceiver 101 is in the "transparent" state, which complies with the ISDN standard. The transmission and reception of data through the ISDN transceiver 101 generates various line and status parameters. The reference (9) indicates that the generated power and status parameters are transmitted from the ISDN transceiver 101 to the ADSL transceiver 102 by means of the serial interface 103. The ADSL transceiver has been in an ADSL mode III since the time $t_4$. The ADSL transceiver can be activated (8) independently of the ISDN mode II. In the state (10), the ADSL transceiver uses the ISDN activation status and potential line parameters during the activation sequence to determine the optimized resource for the maximum achievable ADSL data rate, which can be set in accordance with the ADSL Standard. In the state (11) in the ADSL mode III, various information relating to the ADSL transmission quality (for example line loss) and other line parameters is used during the ADSL start-up sequence for adaptation of the filter coefficients in the ISDN transceiver, in order to reduce the ISDN transmission power corresponding to the transmission characteristics of the subscriber access line 2030.

The reference (12) indicates that the adapted filter coefficients for the ISDN transceiver are transmitted to the ISDN transceiver 101. Since the time $t_5$, the ISDN transceiver 101 has no longer been in the ISDN mode II, with the ISDN transceiver 101 having been changed out of the ISDN mode II as a result of an external interrupt.

In the state (13), the adapted ISDN filter coefficients are used to reset the filter coefficients and, furthermore, the frequency band which is used by the ISDN transceiver is subjected to low-pass filtering. The ISDN transceiver 101 starts to operate again at a time $t_6$, and is thus in the ISDN mode II.

This means that, after the time $t_6$, the ISDN transceiver 101 is in the ISDN mode II, and the ADSL transceiver 102 is in the ADSL mode III.

This means that the ISDN transceiver 101 has been started (14) again by a power-up, and is subsequently in the "transparent" state (15), which complies with the standard. During the ADSL via ISDN mode, the block error rate and the range setting are determined (16) from the ISDN transmission. This allows further optimization of the filter coefficients from the ISDN transceiver to be determined (17) in the ADSL transceiver.

Although the present invention has been described above on the basis of preferred exemplary embodiments, it is not restricted to them but can be modified in a wide range of manners.

LIST OF REFERENCE SYMBOLS

10 Hybrid DSL system
101 Baseband transceiver
102 Non-baseband transceiver
103 Data link
104 Splitter (first-order)
105 Controller
106 Connection for a data switching device
20 Subscriber terminal device
2030 Subscriber access line
201 Subscriber terminal, baseband
202 Subscriber terminal, non-baseband
30 Subscriber switching center
301 Data switching device, baseband
302 Data switching device, non-baseband

What is claimed is:

1. Hybrid DSL system for transmission of hybrid DSL data via a subscriber access line, having:
   a) a baseband transceiver for transmission of first data in a base frequency band via the subscriber access line at a first data transmission rate,
   b) a non-baseband transceiver for transmission of second data in a non-base frequency band via the subscriber access line at a second data transmission rate, and having
   c) a data link for interchanging parameters between the baseband transceiver and the non-baseband transceiver in order to increase the overall data transmission rate of both transceivers.

2. Hybrid DSL system according to claim 1, wherein the first data is speech data.

3. Hybrid DSL system according to claim 1, wherein the overall data transmission rate is the sum of the first data transmission rate and of the second data transmission rate.

4. Hybrid DSL system according to claim 1, wherein the baseband transceiver and the non-baseband transceiver are connected to a controller.

5. Hybrid DSL system according to claim 4, wherein the baseband transceiver, the non-baseband transceiver and the controller form a control loop.

6. Hybrid DSL system according to claim 4, wherein the data link for interchanging parameters is formed by a connection from the baseband transceiver to the controller, and by a connection from the non-baseband transceiver to the controller.

7. Hybrid DSL system according to claim 1, wherein the baseband transceiver and the non-baseband transceiver are integrated.

8. Hybrid DSL system according to claim 4, wherein the baseband transceiver, the non-baseband transceiver and the controller are integrated.

9. Hybrid DSL system according to claim 1, wherein the subscriber access line is intended for the transmission of hybrid DSL data in a bundle of two or more subscriber access lines for transmission of at least one data stream.

10. Hybrid DSL system according to claim 1, wherein the data link is an interface between the two transceivers.

11. Hybrid DSL system according to claim 10, wherein the data link is a serial interface between the two transceivers.

12. Hybrid DSL system according to claim 10, wherein the data link is a parallel interface between the two transceivers.

13. Hybrid DSL system according to claim 1, wherein the transmission power of the baseband transceiver is adjustable so as to reduce the interference load for the subscriber access line for transmission of hybrid DSL data.

14. Hybrid DSL system according to claim 13, wherein the transmission power of the baseband transceiver is adjustable so as to increase the second data transmission rate of the non-baseband transceiver.

15. Hybrid DSL system according to claim 1, wherein the transmission power of the baseband transceiver is adjustable so as to reduce the interference load for the bundle of two or more subscriber access lines for transmission of at least one data stream.

16. Hybrid DSL system according to claim 1, wherein the transmission power of the non-baseband transceiver is adjustable so as to reduce the interference load for the subscriber access line for transmission of the hybrid DSL data.

17. Hybrid DSL system according to claim 16, wherein the transmission power of the non-baseband transceiver is adjustable so as to increase the first data transmission rate of the baseband transceiver.

18. Hybrid DSL system according to claim 1, wherein the transmission power of the non-baseband transceiver is adjustable so as to reduce the interference load for the bundle of two or more subscriber access lines for transmission of at least one data stream.

19. Hybrid DSL system according to claim 1, wherein the baseband transceiver is an ISDN transceiver.

20. Hybrid DSL system according to claim 1, wherein the non-baseband transceiver is an xDSL transceiver.

21. Hybrid DSL system according to claim 20, wherein the xDSL transceiver is an ADSL transceiver.

22. Hybrid DSL system according to claim 20, wherein the xDSL transceiver is a VDSL transceiver.

23. Hybrid DSL system according to claim 1, wherein the parameters which are interchanged between the baseband transceiver and the non-baseband transceiver include both line parameters for the subscriber access lines and status parameters for the two transceivers.

24. Hybrid DSL system according to claim 23, wherein the line parameters include the channel attenuation on the subscriber access line, the signal-to-noise ratio on the subscriber access line, and interference parameters for the bundle of two or more subscriber access lines.

25. Hybrid DSL system according to claim 23, wherein the status parameters include an activation state of the baseband transceiver, an activation state of the non-baseband transceiver, a block error rate for the baseband transceiver, a block error rate for the non-baseband transceiver, bandwidth setting parameters for the baseband transceiver, and bandwidth setting parameters for the non-baseband transceiver.

26. Hybrid DSL system according to claim 1, wherein a splitter is connected to the baseband transceiver and to the non-baseband transceiver, and separates the base frequency band of the baseband transceiver and the non-base frequency band of the non-baseband transceiver.

27. Hybrid DSL system according to claim 26, wherein the splitter is a first-order filter system.

28. Hybrid DSL system according to claim 27, wherein the baseband transceiver, the non-baseband transceiver, and the splitter is are integrated on a common assembly.

29. Hybrid DSL system according to claim 27, wherein the baseband transceiver and the non-baseband transceiver are connected to a controller, and the splitter, the controller, the baseband transceiver and the non-baseband transceiver are integrated on a common assembly.

30. Hybrid DSL system according to claim 1, wherein the hybrid DSL system is provided in a subscriber terminal device.

31. Hybrid DSL system according to claim 1, wherein the hybrid DSL system is provided in a subscriber switching center.

32. Hybrid DSL system according to claim 1, wherein the hybrid DSL system is in each case provided in a subscriber terminal device and in a subscriber switching center, with the subscriber terminal device being connected to the subscriber switching center by means of a common subscriber access line.

33. Method for transmission of hybrid DSL data via a subscriber access line, having the following steps:

a) transmitting of first data in a base frequency band via the subscriber access line at a first data transmission rate by means of a baseband transceiver;

b) transmitting of second data in non-base frequency band via the subscriber access line at a second data transmission rate by means of a non-baseband transceiver; and c) optimizing of the overall data transmission rate of both transceivers as a function of parameters which are interchanged via a data link between the baseband transceiver and the non-baseband transceiver.

* * * * *